(12) United States Patent
Krups et al.

(10) Patent No.: US 7,938,248 B2
(45) Date of Patent: May 10, 2011

(54) FRICTION CONVEYOR SYSTEM AND WORKPIECE CARRIER FOR A FRICTION CONVEYOR SYSTEM

(75) Inventors: Matthias Krups, Koenigswinter (DE); Peter Krups, Anhausen (DE)

(73) Assignee: Ceratis GmbH, Dernbach (DE)

( * ) Notice: Subject to any disclaimer, the term of this patent is extended or adjusted under 35 U.S.C. 154(b) by 337 days.

(21) Appl. No.: 12/201,302

(22) Filed: Aug. 29, 2008

(65) Prior Publication Data

US 2009/0057101 A1    Mar. 5, 2009

(30) Foreign Application Priority Data

Aug. 30, 2007 (DE) .................. 10 2007 040 908

(51) Int. Cl.
*B65G 47/29* (2006.01)
(52) U.S. Cl. ............... 198/465.1; 198/345.3; 193/35 A
(58) Field of Classification Search ............ 198/345.1, 198/345.3, 465.1, 688.1, 781.01, 781.03; 193/35 A; 108/57.15
See application file for complete search history.

(56) References Cited

U.S. PATENT DOCUMENTS

| | | | | |
|---|---|---|---|---|
| 3,099,228 A | * | 7/1963 | Lingg | 104/172.4 |
| 5,076,172 A | * | 12/1991 | Grimm et al. | 104/166 |
| 5,222,587 A | | 6/1993 | Chevalier et al. | |
| 5,398,802 A | * | 3/1995 | Clopton | 198/465.1 |
| 6,019,211 A | * | 2/2000 | Masciarelli, Jr. | 198/345.1 |
| 6,123,028 A | * | 9/2000 | Bellezza | 104/172.3 |
| 6,443,293 B2 | * | 9/2002 | Patrito | 198/465.1 |
| 6,595,347 B2 | * | 7/2003 | Prodel | 198/465.1 |
| 7,219,793 B2 | * | 5/2007 | Robertsson et al. | 198/795 |

FOREIGN PATENT DOCUMENTS

| | | |
|---|---|---|
| DE | 3926755 A1 | 2/1991 |
| DE | 19822554 A1 | 3/1999 |
| DE | 19539844 A1 | 4/2007 |

* cited by examiner

*Primary Examiner* — Douglas A Hess
(74) *Attorney, Agent, or Firm* — Clements Bernard PLLC; Gregory N. Clements

(57) ABSTRACT

A friction conveyor system comprises a conveyor means (10) including a plurality of conveyor elements (16,18) arranged transverse to the conveying direction (12). The conveyor elements (16,18) are partly driven and partly arranged for free rotation. A workpiece carrier (30) can be loosely placed on the conveyor means (10). For conveying the workpiece carriers (30), use is made of disk-shaped transmission elements (26) connected to the driven conveyor elements (18). The transmission elements (26) are in contact with a friction element (38). The friction elements (38) are connected to an actuation element (46). By actuation of the actuation element (46), the friction element (38) is moved into disengaged position in which the transmission elements (26) are not engaged with the friction elements (38) anymore.

18 Claims, 2 Drawing Sheets ized by the disk-shaped transmission elements, which can be formed with a
FRICTION CONVEYOR SYSTEM AND WORKPIECE CARRIER FOR A FRICTION CONVEYOR SYSTEM The present invention relates to a friction conveyor system comprising a friction conveyor means, such e.g. as a roll-, belt- or plate-type conveyor, provided to have workpiece carriers placed loosely thereon. The present invention further relates to a workpiece carrier for such a friction conveyor system.

BACKGROUND OF THE INVENTION

Particularly in serial production, use is made of conveyor means for conveying workpieces between individual workstations where the workpieces will be e.g. assembled or processed. To convey the workpieces, the workpieces are arranged on workpiece carriers, and the workpiece carriers together with the workpieces are moved with the aid of suitable conveyor means. For moving the workpiece carriers, it is known to use friction conveyors. In friction conveyors, the workpiece carriers are not connected tightly to conveyor means but are loosely resting on rolls, for instance. The movement of the workpiece carriers is effected with the aid of the friction forces occurring between the rolls, belts or plates and friction faces of the workpiece carriers. Friction conveyors offer the particular advantage of allowing the workpiece carriers to be held up in line behind each other along the conveying path. During such a hold-up process, the corresponding drive means of the friction conveyors will merely perform a slipping movement. Thus, in friction conveyors, a bothersome and complicated disengagement from a conveyor means, e.g. from a chain, is not required.

Further, friction conveyors offer the advantage that curves and preferably branches can be negotiated in a simple manner. With the aid of branch devices, such as e.g. switches, individual workpiece carriers can be caused to merge into the conveying line or to leave the same. In this regard, friction conveyors have a high flexibility. A friction conveyor of this type is described in DE 40 36 214.

In friction conveyors, since the workpiece carriers have to be stopped at the individual work stations by means of a hold-up process, the driven rolls or conveying elements have to be provided with slip clutches. Such slip clutches are expensive and will require intensive maintenance. Further, slip clutches have to be adjusted and set, respectively, in order to define a rotational moment from which onward the slip clutch will slip. Due to wear, the setting has to be checked at regular intervals.

Known from DE 105 39 844 C2 is a friction conveyor system wherein, for accelerating workpiece carriers, individual driven conveyor elements such as e.g. rolls are provided with disk-shaped transmission elements. The disk-shaped transmission elements, which can be formed with a toothing thereon, are configured to engage a slot extending in the longitudinal direction of the workpiece carrier and comprising e.g. a tooth rack. Using such additional transmission elements, the workpiece carrier can be accelerated.

It is object of the invention to provide a friction conveyor system wherein the stopping or hold-up of workpiece carriers is simplified. A further object of the invention resides in providing a corresponding workpiece carrier for friction conveyor systems.

According to the present invention, the above objects are achieved by a friction conveyor system as defined in claim 1 and a workpiece carrier as defined in claim 2.

SUMMARY OF THE INVENTION

The friction conveyor of the invention comprises a conveyor means including a plurality of conveyor elements arranged preferably transversely the direction of conveyance. The conveyor elements can be designed as roll belts or as plates. In case of linear conveying paths, the conveyor elements are normally arranged transversely to the conveying direction, while in the region of curves or branch paths, obliquely arranged conveyor elements can be provided. The conveyor elements, usually provided in the form of rolls, extend e.g. across the whole width of the conveyor means. Further, it can be provided that individual conveyor elements and rolls, respectively, are arranged only in the edge region of the conveyor means so that the workpiece on the workpiece carrier is accessible also from below. The conveyor elements are partly driven and partly arranged for free rotation. In this arrangement, the distance between the driven conveyor elements is normally shorter than the length of the workpiece carrier so that at all times at least one driven conveyor element is in contact with the workpiece carrier for conveyance. In the friction conveyor system of the invention, the workpiece carriers are loosely supported on the conveyor elements of the conveyor means. No mechanical coupling exists between the workpiece carriers and the conveyor means.

Connected to the driven conveyor elements are transmission elements which, for conveying the workpieces, cooperate with friction regions provided on the workpiece carriers. The transmission elements can be regions of the conveyor elements which have a higher friction, i.e. a different type of surface. Preferably, the transmission elements are continuous belts and/or disk-shaped elements which have a round cross section and a diameter larger than that of the diameter of a roll. Generally speaking, according to a preferred embodiment, the transmission element is arranged to project relative to an outer side of the conveyor element. The transmission element cooperates with the friction region provided on the workpiece carrier, while also this friction region can be provided as a region with increased friction. This cooperation can be effected by use of suitable materials and by modification of the surface roughness in the friction region.

According to the invention, the friction region is arranged on a friction element connected to the workpiece carrier. As provided by the invention, the friction element is connected to the workpiece carrier in a movable manner. Further, the friction element is connected to an actuation element. With the aid of the actuation element, the friction element can be moved. The movement of the friction element can be used to establish a distance between the transmission element and the friction element, and/or the friction between these elements can be reduced by reduction of the abutment pressure. Thus, by means of the actuation element, there is generated a movement of the friction element to the effect that the distance between the friction element and the transmission element will be enlarged and, preferably, a gap will be formed between these two elements. Thus, what is effected by actuating the friction element is a disengagement between the transmission element and the friction element; in the context of the description of the present invention, the term "disengagement" is to be understood as denoting also a reduction of the friction between these two elements.

According to the invention, the actuation element can be activated by a stopper element in the region of a work station or by occurrence of a hold-up of the workpiece carriers. Thus, a stopping of the workpiece carriers will always have the effect that the transmission element and the friction element are disengaged. This has the inventive advantage that conveyor elements without slip clutches can be provided because the driven conveyor elements will be allowed to rotate freely as soon as the friction element and the transmission element have been disengaged. At least, it is rendered possible to install slide clutches of a considerably simplified structure which then will substantially serve as an additional safety element.

The friction conveyor system of the invention is preferably suited for the transport of workpieces having a weight of less than 250 kg. Preferably, in such friction conveyor systems, the workpiece carrier will rest immediately on the conveyor elements without a provision of additional support members such as, e.g., support rolls provided on the workpiece carrier.

A further independent invention resides in a workpiece carrier for friction conveyor systems, preferably for the above described inventive friction conveyor systems. The friction conveyor comprises a base body for receiving workpieces. For instance, the workpiece will be laid onto the base body and be fixed thereon by holding means such as clamping jaws and the like. The workpiece carrier comprises a friction region which normally is provided on the underside of the base body and, when the workpiece carrier has been placed, is facing towards the friction conveyor. Via this friction region, the conveying forces required for moving the workpiece carrier are taken up. According to the invention, the friction region is arranged on a movable friction element connected to the base body. The friction element is connected to an actuation element. As described above in the context of the friction conveyor system, the activation of the actuation element will cause a movement of the friction element, thus moving the friction element into a disengaged position. This will result in a reduction of the friction between the friction region of the workpiece carrier and the friction or transmission elements of the conveyor means, rendering it possible to stop the workpiece carrier in a simple manner with considerably reduced friction, e.g. at work stations. Preferably, the friction element will be moved in such a manner that, in the friction region of the base body of the workpiece carrier, no friction will occur anymore while, instead, the friction region will be arranged at a distance to the corresponding friction and transmission element, respectively. This offers the advantage—described above with regard to the friction conveyor system—of allowing the use of driven conveyor elements without a slip clutch or with a significantly more favorable slip clutch.

Further preferred embodiments of the workpiece carriers will be described hereunder, wherein these preferred embodiments of the workpiece carriers will represent also preferred embodiments of the friction conveyor system.

Preferably, the friction elements are arranged in a recess of the workpiece carrier and of the base body of the workpiece carrier, respectively. The recess preferably has a slit-like shape. According to a preferred embodiment, at least two recesses, preferably having a slit-like shape, are provided for each workpiece carrier. The recesses extend preferably over the complete length of the workpiece carrier in the longitudinal direction of the latter and in the conveying direction, respectively. The two recesses are preferably arranged in parallel to each other. Preferably, each recess is open at its ends so that an e.g. disk-shaped transmission element can be easily inserted into the recess.

According to a preferred embodiment, the friction element, which is preferably arranged within the recess, has a rod-like shape. Preferably, this rod has a rectangular cross section wherein the side facing toward the transmission element of the conveyor elements can have an increased roughness. Preferably, the friction element extends substantially along the full length of the workpiece carrier. At least, the friction element is to extend along three quarters of the length of the workpiece carrier. Thereby, the spacing of the driven conveyor elements can be correspondingly enlarged.

The actuation element can be of the electrically and/or magnetically driven type. The actuation element can e.g. comprise a sensor arranged to detect a hold-up condition. As soon as the hold-up condition is detected, the friction element will by moved with the aid of the actuation element.

According to a preferably preferred embodiment of the invention, the actuation element is of the mechanical type. Preferably, the actuation element is fixedly connected to the at least one friction element, especially to the two friction elements provided for each workpiece carrier. In this arrangement, the actuation element can project beyond the front end of the workpiece carrier e.g. in the manner of an automobile bumper. Thus, when the workpiece carrier impinges onto a stopper, onto another workpiece carrier arranged upstream of the first workpiece carrier or onto an obstacle, the actuation element will be displaced in the direction of the workpiece carrier. Because of the preferably fixed mechanical connection of the actuation element to the at least one friction element, the resultant movement of the actuation element will automatically cause also a movement of the at least one friction element, preferably of both friction elements. Due to this movement the friction element reaches a disengaged position so that the friction between the friction region of the friction element and the transmission element will become at least reduced and, preferably, the two elements will be moved into a mutual distance.

To guarantee a defined movement of the friction element, a moving element is provided. The moving element can be realized in the form of guide grooves and/or guide projections arranged on the workpiece carrier and the base body, respectively, in order to guarantee a defined orientation and movement of the friction element into the disengaged position when the actuation element is activated.

According to a particularly preferred embodiment, the moving element comprises a preferably rod-shaped projection which is fixedly connected to the workpiece carrier and the base body, respectively. The projection is arranged to enter an opening or groove formed on the friction element. Of course, it is also possible to provide the projection on the friction element and to have it enter an opening formed on the workpiece carrier.

The projection and/or the opening of the moving element are configured in such a manner that a movement of the friction element in the longitudinal direction of the workpiece carrier, which movement preferably is effected by the actuation element, will automatically cause a movement into the disengaged position, i.e. into a position with little or no friction at all between the transmission element and the friction element. Preferably, during the movement of the friction element in the longitudinal or transport direction, the moving element will effect a movement of the friction element vertically to the longitudinal direction away from the conveyor means. In this manner, the friction element will be disengaged from the transmission element.

The opening provided in the friction element or the workpiece carrier is preferably formed as a longitudinal hole having arranged therein a circular pin or projection. The longitudinal hole is preferably oriented at an angle of ≠0° relative to the longitudinal direction of the workpiece. The longitudinal hole preferably has a downward slope in the conveying direction. This has the advantage that the transmission element after engaging the friction element will block a movement of the friction element as soon as the workpiece carrier has been released again and the friction element is moving downward in the direction of the transmission element.

The movement of the friction element from the disengaged position into the engaged position can be performed by a spring element or the like. Preferably, it should be sufficient that the transfer of the friction element into the engaged position is carried out under the influence of the weight of the friction element itself.

According to a particularly preferred embodiment of the friction conveyor system, the transmission element is formed in the shape of a disk, preferably in a shape corresponding to a wheel flange. Preferably, the transmission element is arranged to project into slot-shaped recesses of the workpiece carrier. Thereby, there is additionally guaranteed a lateral guidance.

In the friction conveyor systems of the invention, the driven conveyor elements substantially serve for the driving or conveying of the workpiece carriers. The weight of the workpiece carrier and of the workpiece is substantially not taken up by the driven conveyor elements. Thus, the driven conveyor elements are in contact with the workpiece carrier preferably exclusively via the transmission elements. This can be obtained e.g. in that the diameter of the driven conveyor elements from a region of the disk-shaped transmission elements is smaller than the diameter of the non-driven conveyor elements if the conveyor elements are rolls. This has the effect that the underside of the workpiece carrier is supported exclusively on the non-driven conveyor elements.

The driven conveyor elements, which preferably are formed as rolls, are with preference driven by an electric motor. According to the invention, no slide clutch need be provided in this case.

A preferred embodiment of the invention will be described hereunder with reference to the accompanying drawings.

DETAILED DESCRIPTION OF A PREFERRED EMBODIMENT

Figure 1:
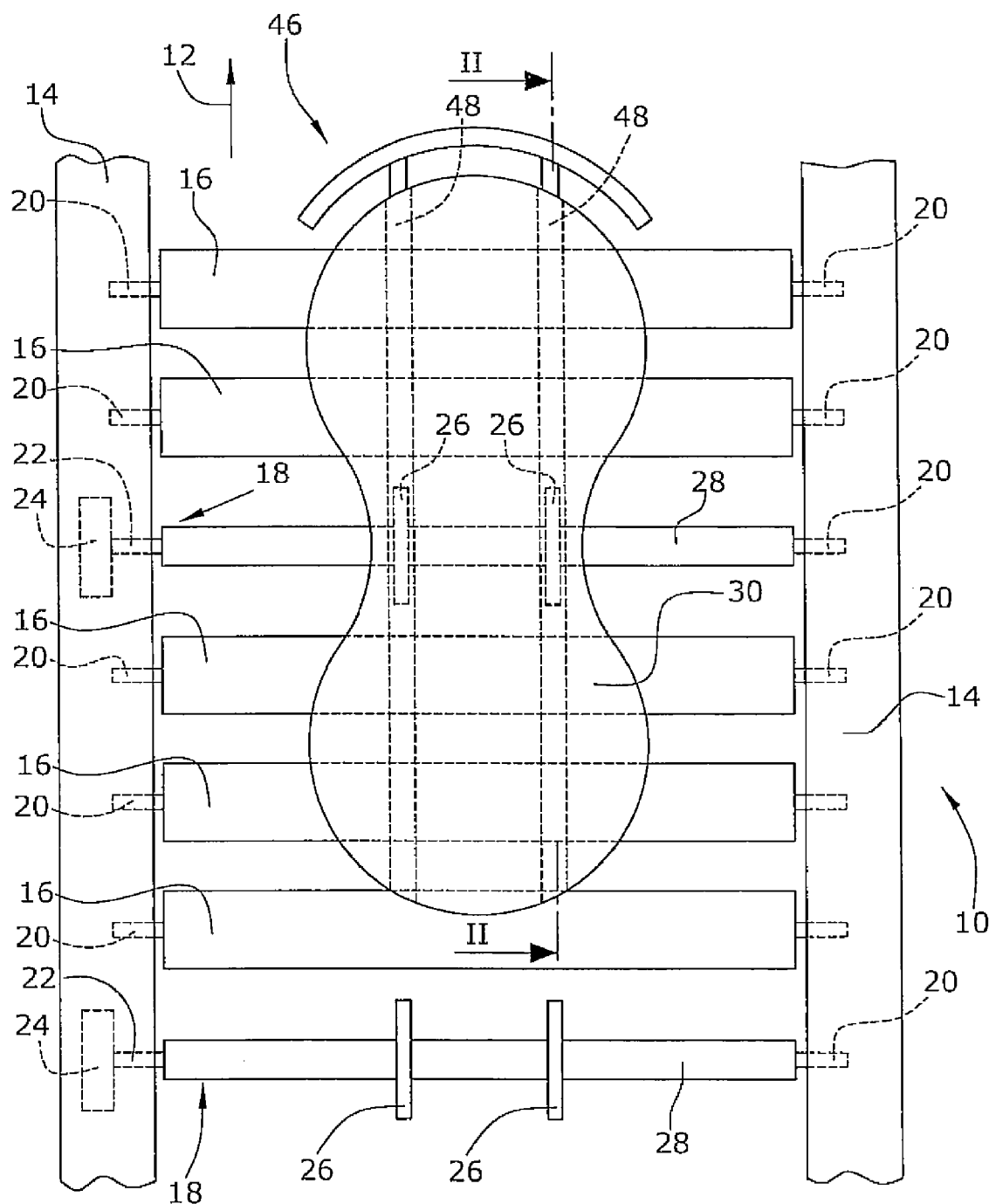
FIG. 1 is a schematic plan view of a friction conveyor system with workpiece carrier.

The friction conveyor system comprises a conveyor means 10. Conveyor means 10 comprises frames 14 extending in the longitudinal or conveying direction 12. The conveyor system can additionally comprise switches and curves (not shown). The frames 14 are provided for supporting conveyor elements 16,18 which in the illustrated embodiment are formed as rolls. The conveyor elements 16 are arranged for free rotation on frame 14 via axles 20 and corresponding bearings. The conveyor elements 18 are driven conveyor elements. In the illustrated embodiment, the driven conveyor elements extend along the whole width of conveyor means 10 so that one side of the driven conveyor elements 18 is arranged for free rotation on frame 14 via a shaft 20. The second shaft 22 of the driven conveyor elements 18 is of the driven type and is connected to an electric motor 24.

In the illustrated embodiment, the non-driven conveyor elements 16 as well as the driven conveyor elements 18 extend along the whole width of conveyor means 10. It can also be provided that individual conveyor elements are connected to the two opposite frames 14 in such a manner that a free space exists between the conveyor elements. Thereby, access to the workpieces is possible also from below.

The driven conveyor elements in the illustrated embodiment comprise two disk-shaped transmission elements 26. The two disk-shaped transmission elements 26 are arranged at a mutual distance and in the illustrated embodiment are supported by a cylindrical roll 28. The cylindrical roll 28 has a smaller outer diameter than the likewise cylindrical non-driven rolls 16.

A workpiece carrier 30 rests on the upper side of conveyor means 10 and is arranged to be moved by the driven conveyor elements 18 in the direction indicated by arrow 12.

The workpiece carrier 30 comprises a base body 32. The underside 34 of base body 32 rests on the non-driven, freely rotatable rolls 16. Thus, the rolls 16 substantially serve for taking up the workpiece arranged on an upper side 36 of workpiece carrier 30.

Figure 2:
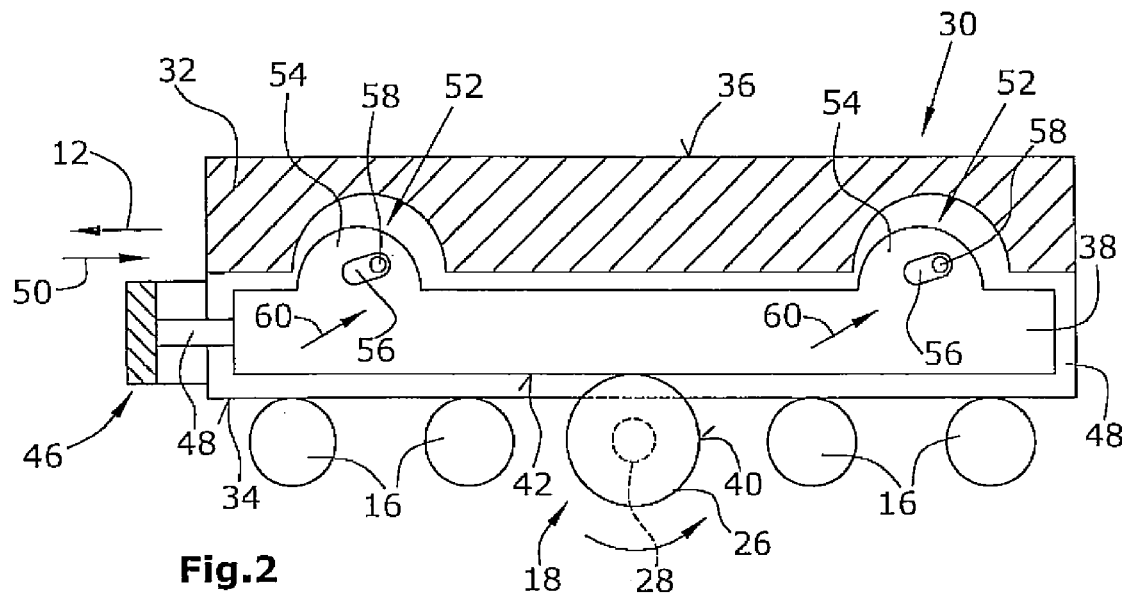
FIG. 2 is a schematic sectional view along the line II-II in FIG. 1, with the transmission elements shown in engagement with the friction elements.
Figure 3:
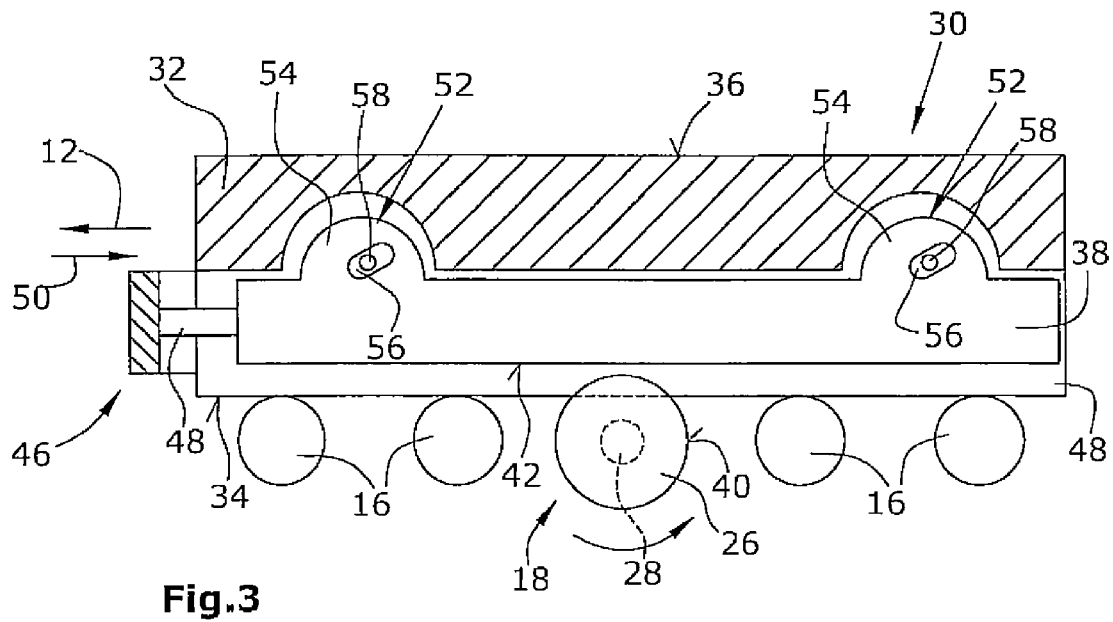
FIG. 3 is a schematic view corresponding to FIG. 2 wherein, however, the friction elements are shown in the disengaged condition relative to the transmission elements.

For moving the workpiece carrier 30 in the conveying direction 12, friction elements 38 are arranged in abutment with the transmission elements 26 during the movement (FIG. 2). For this purpose, the disk-shaped transmission elements 26 have a cylinder-jacket-shaped outer surface 40 arranged in abutment with a preferably plane friction region 42 of friction element 38. In this arrangement, the friction element 38 is preferably of a cylindrical cross section so that the friction region 42 represents a planar surface extending along the whole length of friction element 38. Thus, by turning the driven conveyor elements 18 in the direction indicated by arrow 44, the workpiece carrier 30 will be transported in the direction of arrow 12 (FIG. 2).

To make it possible to stop the workpiece carrier 30, e.g. at a processing position or in case of a hold-up of a plurality of workpiece carriers, the—in the illustrated embodiment two—friction elements 38 extending along the whole length of workpiece carrier 30 are connected to an actuation element 46. The actuation element 46, configured in the manner of a bumper, is tightly connected to the two friction elements 38 via preferably rod-shaped connection elements 48.

Thus, the friction elements 38 respectively arranged in a slot-shaped recess 48 of workpiece carrier 30 will be positively moved within the slot 48 when the actuation element 46 is pushed in the direction indicated by arrow 50. This is effected by impingement on a stopper element or by impingement on a further workpiece carrier arranged upstream of workpiece carrier 30 in the conveying direction. Due to the mechanical connection between the actuation element 46 and the two friction elements 38, no sensor or electric drive means is required for moving the friction elements 38 into the disengaged position. Instead, a displacement of actuation element 46 in the direction of arrow 50 will cause a displacement also of the friction elements 38.

In order to guarantee a displacement of the friction elements 38 into the disengaged position, there are further provided two moving elements 52 which in the illustrated embodiment are tightly connected to the friction elements 38. In this regard, respectively two moving elements 52 are provided per friction element 38. According to the illustrated embodiment, the moving elements 52 are tab-like projections 54 which are connected to the rod-shaped friction element and respectively comprise a longitudinal hole 56. The longitudinal hole 56 extends at an angle or obliquely to the conveying direction 12 and is formed with a downward slope in the conveying direction 12. In each of the two openings 56 formed as longitudinal holes, a projection 58 is arranged which in the illustrated embodiment is formed as a cylindrical pin. The pin 58 is tightly connected to the base body 32 of workpiece carrier 30.

Thus, a movement of the actuation element 46 in the direction indicated by arrow 50 will result in a movement of the friction elements 38 in the direction of arrow 60, i.e. parallel to the orientation of the longitudinal holes 56. Thereby, the friction elements 38 are brought into the disengaged position relative to the transmission elements 26.

The invention claimed is:

1. A friction conveyor system comprising
a conveyor means (10) including a plurality of conveyor elements (16,18) arranged preferably transverse to the conveying direction (12), the conveyor elements (16,18) being partly driven and partly arranged for free rotation, workpiece carriers (30) adapted to be loosely placed on the conveyor means (10), and transmission elements (26) connected to the driven conveyor elements (18) and cooperating with friction regions (42) provided on the workpiece carrier (30) so as to convey the workpiece carriers (30),
wherein
the friction regions (42) are arranged on a friction element (38) which is movably connected to the workpiece carrier (30), the friction element (38) being connected to an actuation element (46) adapted to cause the friction region (42) of the friction element (38) to become disengaged from the transmission element (26) of the driven conveyor elements (18).

2. The friction conveyor system according to claim 1, wherein the at least one transmission element (26) is disk-shaped.

3. The friction conveyor system of claim 2, wherein the friction element (38) is arranged in a slot-shaped recess (48) of the workpiece carrier (30), wherein the disc-shaped transmission element (26) extends into the slot-shaped recess of the workpiece carrier.

4. The friction conveyor system according to claim 1, wherein the driven conveyor elements (18) serve substantially only for moving the workpiece carrier (30) but not for force take-up.

5. The friction conveyor system according to claim 1, wherein the driven conveyor elements (18) are in contact with the workpiece carrier (30) exclusively via the transmission elements (26).

6. The friction conveyor system according to claim 1, wherein the driven conveyor elements (18) have a smaller diameter than the non-driven conveyor elements (16).

7. The friction conveyor system according to claim 1, wherein the driven conveyor elements (18) are connected to a drive means (24) for permanent operation without provision of a slip clutch.

8. A workpiece carrier for friction conveyors, comprising a base body (32) for taking up workpieces, and
a friction region (42) provided to receive conveying forces, wherein
the friction region (42) is arranged on a friction element (38) which is movably connected to the base body (32), the friction element (38) being connected to an actuation element (46) adapted to move the friction element (38) into a disengaged position, wherein a moving element (52) is provided to move the friction element (38) into the disengaged position, wherein the moving element (52) comprises a projection (58) tightly connected to the base body (32) or the friction element (38) and arranged to engage an opening (56) provided in the friction element (38) or the base body (32), wherein the projection (58) and/or the opening (56) are configured in such a manner that a movement of the friction element (38) in the longitudinal direction (12) of the workpiece carrier (30) will cause a compulsory movement into the disengaged position, vertically to the longitudinal direction (12) of the workpiece carrier (30) away from the conveyor means (10), wherein the opening (56) is provided as a longitudinal hole (56) formed at an angle to the longitudinal direction (12) of the workpiece carrier (30) at a downward slope in the conveying direction (12).

9. The workpiece carrier according to claim 8, wherein the friction element (38) is arranged in a recess (48) of the workpiece carrier (30).

10. The workpiece carrier of claim 9, wherein the recess (48) is slot-shaped.

11. The workpiece carrier according to claim 8, wherein at least two mutually parallel friction elements (38) are provided.

12. The workpiece carrier according to claim 11, wherein the at least two friction elements (38) are adapted to be actuated via a common actuation element (46).

13. The workpiece carrier of claim 11, wherein said friction elements (38) extend in the longitudinal direction of the workpiece carrier.

14. The workpiece carrier according to claim 8, wherein the friction element (38) is rod-shaped.

15. The workpiece carrier of claim 14, wherein the rod-shaped friction element (38) extends substantially along the complete length of the workpiece carrier.

16. The workpiece carrier according to claim 8, wherein the actuation element (46) is formed as a mechanical actuation element.

17. The workpiece carrier according to claim 8, wherein the projection (58) and/or the opening (56) are configured in such a manner that a movement of the friction element (38) in the longitudinal direction (12) of the workpiece carrier (30) will cause a compulsory movement into the disengaged position, vertically to the longitudinal direction (12) of the workpiece carrier (30) away from the conveyor means (10).

18. The friction conveyor system comprising a conveyor means (10) including a plurality of conveyor elements (16,18) arranged transverse to the conveying direction (12), the conveyor elements (16,18) being partly driven and partly arranged for free rotation, workpiece carriers (30), according to claim 2, adapted to be loosely placed on the conveyor means (10), and transmission elements (26) connected to the driven conveyor elements (18) and cooperating with friction regions (42) provided on the workpiece carrier (30) so as to convey the workpiece carriers (30), wherein the friction regions (42) are arranged on a friction element (38) which is movably connected to the workpiece carriers (30), the friction element (38) being connected to an actuation element (46) adapted to cause the friction region (42) of the friction element (38) to become disengaged from the transmission element (26) of the driven conveyor elements (18).

* * * * *